(12) United States Patent
Zanzig et al.

(10) Patent No.: US 6,515,063 B2
(45) Date of Patent: Feb. 4, 2003

(54) TIRE HAVING COLORED TREAD

(75) Inventors: David John Zanzig, Uniontown, OH (US); Paul Harry Sandstrom, Tallmadge, OH (US)

(73) Assignee: The Goodyear Tire & Rubber Company, Akron, OH (US)

( * ) Notice: Subject to any disclaimer, the term of this patent is extended or adjusted under 35 U.S.C. 154(b) by 29 days.

(21) Appl. No.: 09/775,219

(22) Filed: Feb. 1, 2001

(65) Prior Publication Data

US 2002/0147257 A1 Oct. 10, 2002

(51) Int. Cl.$^7$ .................................................. C08L 3/34
(52) U.S. Cl. ...................... 524/493; 524/492; 524/115; 524/127; 524/128; 524/143; 525/333.4; 525/333.5
(58) Field of Search ................................. 524/115, 117, 524/127, 128, 139, 145, 152, 492, 493; 525/333.4, 333.5, 332.5, 332.9

(56) References Cited

U.S. PATENT DOCUMENTS

| | | | |
|---|---|---|---|
| 4,319,620 A | | 3/1982 | Knill .......................... 152/209 |
| 5,094,829 A | | 3/1992 | Krivak et al. ................ 423/339 |
| 5,283,285 A | * | 2/1994 | Akkapeddi et al. ........... 525/67 |
| 5,708,069 A | | 1/1998 | Burns et al. ................. 524/403 |
| 5,750,610 A | | 5/1998 | Burns et al. ................. 524/434 |
| 5,789,514 A | | 8/1998 | Burns et al. .................. 528/12 |
| 6,044,882 A | * | 4/2000 | Crawford et al. ......... 152/152.1 |

FOREIGN PATENT DOCUMENTS

| | | | |
|---|---|---|---|
| WO | 9910299 | 1/1999 | ........... B60C/11/00 |
| WO | WO 99/31178 A1 | * 6/1999 | |

* cited by examiner

Primary Examiner—Edward J. Cain
Assistant Examiner—Katarzynai Wyrozebski Lee
(74) Attorney, Agent, or Firm—Henry C. Young, Jr.

(57) ABSTRACT

The present invention relates to a tire having a rubber tread of a lug and groove configuration and which may be of a co-extruded cap/base construction; wherein at least a part of the visible portion of the tread is exclusive of carbon black and thereby of a color other than black. Such non-black colored rubber includes the outer surface of at least one of said tread lugs intended to be ground-contacting. In one aspect of the invention, said non-black colored rubber composition contains (A) a precipitated silica reinforcement which has been pre-treated with a hydrophobation agent and optionally also pre-treated with a coupling agent or (B) a precipitated silica which has been pre-treated with a hydrophobating agent and a coupling agent which does not from an alcohol byproduct upon reacting with hydroxyl groups (e.g. silanol groups) contained on the surface of said precipitated silica. In another aspect of the invention, said non-black colored rubber composition is comprised of at least one diene based elastomer and a brominated poly(isobutylene-co-para-methylstyrene) where a coupling agent for said silica is an organo phosphite.

15 Claims, 2 Drawing Sheets

FIG-2

TIRE HAVING COLORED TREAD

FIELD OF THE INVENTION

The present invention relates to a tire having a rubber tread of a lug and groove configuration and which may be of a co-extruded cap/base construction; wherein at least a part of the visible portion of the tread is exclusive of carbon black and thereby of a color other than black. Such non-black colored rubber includes the outer surface of at least one of said tread lugs intended to be ground-contacting. In one aspect of the invention, said non-black colored rubber composition contains (A) a precipitated silica reinforcement which has been pre-treated with a hydrophobation agent and optionally also pre-treated with a coupling agent or (B) a precipitated silica which has been pre-treated with a hydrophobating agent and a coupling agent which does not from an alcohol byproduct upon reacting with hydroxyl groups (e.g. silanol groups) contained on the surface of said precipitated silica. In another aspect of the invention, said non-black colored rubber composition is comprised of at least one diene based elastomer and a brominated poly(isobutylene-co-para-methylstyrene) where a coupling agent for said silica is an organo phosphite.

BACKGROUND FOR THE INVENTION

Tires are typically provided with its various components as various rubber compositions which contain carbon black reinforcement and which are therefore black in color.

Most tires have a tread of a lug and groove configuration, of which many tires are of a cap/base construction of for which the rubber tread cap contains the lug and groove configuration wherein the outer surfaces of the lugs are designed to be ground-contacting and for which the rubber tread base underlies the tread cap. Such cap/base tire construction and such tread lug and groove configuration are well known to those having skill in such art.

However, it remains desirable for some purposes to provide a tire with a tread of which at least a portion is of a non-black color so that the resulting tread is of a non-black color of a multiplicity of colors.

For purposes of this invention, it is intended to provide a black colored tread of lug and groove configuration which is further configured with at least a portion of the visible surface of said tread is of a non-black color, preferably a color which contrasts with black. Thus the visible portion of the tire tread is of at least two different visible colors which may be black and at least one additional color.

It is appreciated that it is also desired to provide a tire with a tread with appropriate wear and traction characteristics and it is often difficult to provide a tire tread with segments of differing rubber compositions, as would be utilized in a case of a tire tread with road-contacting segments of contrasting colors, which have the same or very similar wear and traction. For example, see PTC patent application WO 99/01299.

Also, historically, a typical example of a component of a tire having a color which contrasts with the conventional black color of the tire is a tire sidewall in which a portion of the rubber is white in color resulting from a blend of rubber and titanium dioxide pigment in the absence of, or exclusive of, particulate carbon black reinforcement. Indeed, tires with white colored portions of their sidewalls are well known.

However, for tire treads, it is also appreciated that coloring pigments such as titanium dioxide, by itself, does not provide significant rubber reinforcement equivalent to rubber reinforcing carbon black. Therefore, such white colored tire components are conventionally limited to rubber compositions which do not need such a high degree of reinforcement such as for example, outer, visible, portions of tire sidewalls.

It is also appreciated that many non-black colored rubber composition for tire components, particularly white sidewall components have a tendency to discolor as a result of various discoloring chemicals which may be contained in various rubber compositions which are adjacent to the colored rubber composition. Accordingly, it is a common practice to use substitute non-discoloring chemicals for discoloring chemicals in such adjacent rubber compositions such as for example, non-discoloring antidegradants and non-discoloring rubber processing oils. Such practice is well known in the tire white sidewall art.

In the description of this invention, the terms "rubber" and "elastomer" if used herein, may be used interchangeably, unless otherwise prescribed. The terms "rubber composition", "compounded rubber" and "rubber compound", if used herein, are used interchangeably to refer to "rubber which has been blended or mixed with various ingredients and materials" and such terms are well known to those having skill in the rubber mixing or rubber compounding art.

In the description of this invention, the term "phr" refers to parts of a respective material per 100 parts by weight of rubber, or elastomer. The terms "rubber" and "elastomer" may be used interchangeably unless otherwise indicate. The terms "cure" and "vulcanize" may be used interchangeably unless otherwise indicated.

SUMMARY AND PRACTICE OF THE INVENTION

In accordance with this invention, a tire having a tread comprised of at least one non-black colored, exclusive of carbon black, rubber composition, wherein said tread is of a co-extruded cap/base construction; wherein said tread cap is configured with lugs and grooves; wherein said tread cap is comprised of said non-black colored rubber composition comprised of, based upon parts by weight per 100 parts by weight elastomer(s), (phr):

(A) 100 phr of elastomer comprised of
  (1) about 5 to about 80, alternately about 10 to about 50, phr of a halogenated copolymer of isobutylene and p-methyl styrene, wherein said halogen is selected from bromine or iodine, preferably bromine,
  (2) about 20 to about 95, alternately about 50 to about 90, phr of at least one diene-based elastomer and (B) about 25 to about 100, optionally about 35 to about 90, phr of particulate reinforcing filler comprised of synthetic amorphous silica aggregates, wherein said silica aggregates contain hydroxyl groups (e.g. silanol groups) on their surface; and (C) about 0.5 to about 25, preferably about 1 to about 15, phr of at least one organo phosphite selected from monophosphites selected from formula (I) and diphosphites selected from formula (II) and diisodecyl pentaerythritol diphosphite, distearyl pentaerythritol diphosphite and pentaerythritol diphosphite, preferably monophosphites of formula (I):

$$(OR^4)—P—(OR^4) \atop (OR^4), \text{ and} \qquad (I)$$

$$((OR^4)_2—P—O—R^5)_2—R^6 \qquad (II)$$

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;

wherein said organo phosphite is preferably the organo phosphite of formula (I)

wherein said organo phosphite is provided by one or more of the following:
(a) by mixing said organo phosphite with said elastomer(s) and said synthetic silica in an internal rubber mixer,
(b) by pre-reacting said halogenated copolymer of isobutylene and p-methyl styrene with said organo phosphite prior to blending said reinforcing filler therewith,
(c) by pre-reacting said organo phosphite with an aqueous dispersion of colloidal silica particles from which a precipitated silica is recovered to form an organo phosphite/silica composite thereof,
(d) mixing said organo phosphite with said elastomer(s) and said synthetic silica, preferably in an internal rubber mixer, according to any of said steps (a), (b) or (c), wherein said synthetic silica includes pre-hydrophobated silica aggregates which have been pre-hydrophobated prior to mixing with said elastomers with an alkylsilane of formula (III),
(e) mixing said organo phosphite with said elastomer(s) and an alkylsilane of the said Formula (III) with said elastomer(s) and said synthetic silica, preferably in an internal rubber mixer, and
(f) by pre-reacting said organo phosphite and said alkylsilane of Formula (III), and optionally an organomercaptosilane of the general formula (IV), with
  (i) said aggregates of synthetic precipitated silica or
  (ii) an aqueous dispersion of colloidal silica particles from which a precipitated silica is recovered to form a silica composite thereof,
wherein said alkylsilane of the general Formula (III) is represented by $$X_n—Si—R_{4-n} \qquad (III)$$

wherein R is an alkyl radical having from one to 18 carbon atoms, n is a value of from 1 to 3 and X is a radical selected from chlorine or bromine or alkoxy radical as (OR1)—, wherein R1 is an alkyl radical selected from methyl and ethyl radicals, and where said organomercaptosilane is of the general formula (IV):

$$(X)_n(R^2O)_{3-n}—Si—R^3—SH \qquad (IV)$$

wherein X is a radical selected from chlorine, bromine, and alkyl radicals having from one to 16 carbon atoms; wherein $R^2$ is an alkyl radical having from one to 16 carbon atoms and $R^3$ is an alkylene radical having from one to 16 carbon atoms; and n is a value from zero to 3.

In further accordance with this invention, said tire tread cap is composed of from three to five co-extruded transverse sections, each section positioned circumferentially around the tire and extending from one peripheral edge of the tread to the other, namely, two, spaced apart outboard tire tread cap sections each section including about 10 to about 40 percent of the tire tread cap and from one to three, preferably one, tire tread cap sections positioned in the central portion of the tire tread cap and between said outboard tire tread cap sections; where at least one of said central tire tread cap sections is of a non black-colored, exclusive of carbon black, rubber composition and said two outboard tire tread rubber compositions are of said black colored, carbon black-containing, rubber composition.

In the practice of this invention, said rubber composition may also contain an additional coupling agent as, for example, an alkoxysilyl polysulfide such as for example, a bis(3-trialkoxysilylalkyl) polysulfide wherein alkyl radicals for said alkoxy groups are selected from one or more of methyl and ethyl radicals, preferably an ethyl radical and the alkyl radical for said silylalkyl component is selected from butyl, propyl and amyl radicals, preferably a propyl radical and wherein said polysulfide component contains from 2 to 8, with an average of from 2 to 2.6 or from 3.5 to 4, sulfur atoms in its polysulfidic bridge.

Representative of such other coupling agents are, for example, bis(3-triethoxysilylpropyl) polysulfide having an average of from 2 to 2.6 or from 3.5 to 4, sulfur atoms in its polysulfidic bridge.

Such additional coupling agent may, for example, be added directly to the elastomer mixture or may be added as a composite of precipitated silica and such coupling agent formed by treating a precipitated silica therewith or by treating a colloidal silica therewith and precipitating the resulting composite.

In further accordance with this invention, said tire is provided wherein at least one component thereof is in contact with said non-black colored sidewall and/or non-black colored groove is of a black colored rubber comprised of said non-black colored rubber composition, wherein, however, said particulate reinforcing filler is comprised of about 25 to about 100, optionally about 35 to about 90, phr of particulate reinforcing filler comprised of about 25 to about 100, optionally about 35 to about 90, phr of particulate reinforcing filler comprised of
(A) from zero to about 100, alternately about 10 to about 85, phr of synthetic amorphous silica aggregates and, correspondingly,
(B) from zero to about 75, alternately about 10 to about 60 phr of at least one of carbon black and silica treated carbon black having domains of silica on its surface.

wherein said silica aggregates contain hydroxyl groups (e.g. silanol groups) on their surface.

A significant aspect of this invention is the use of a reaction product of said organo phosphite and a said halogenated (preferably brominated) copolymer of isobutylene and p-methyl styrene in order to improve the polymer (e.g. elastomer) to filler interaction (via reaction of the organo phosphite with the halogen of the halogenated copolymer of isobutylene and p-methyl styrene) to thereby enhance resulting rubber composition properties leading to enhanced tire component (e.g. tire tread) properties including aged performance such as, for example durability and/or stability properties.

Representative examples of organo phosphites understood to be commercially available are, for example for example, triisodecyl phosphite, trilauryl phosphite, tris (tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, triisooctyl phosphite and tris (2-ethylhexyl) phosphite, as well as tris (2,4-ditbutylphenyl) phosphite, and bis 2,4,6,tri-t-butylphenyl 2-butyl-2-ethyl-1,3-propanediol phosphite; and diphosphites as, for example, distearyl pentaerythritol diphosphite, bis (2,4-di-t-butylphenyl) pentaerythritol diphosphite, bis (2,6, di,t-butyl4-methylphenyl pentaerythritol diphosphite, bis (2,4-dicumylphenyl) pentaerythritol diphosphite and mixtures thereof.

In practice, the synthetic amorphous silica may be selected from aggregates of precipitated silica, which is intended to include precipitated aluminosilicates as a co-precipitated silica and aluminum, and from fumed (pyrogenically formed) silica.

Such precipitated silica is, in general, well known to those having skill in such art. For example, such precipitated silica may be precipitated by controlled addition of an acid such as, for example, hydrochloric acid or sulfuric acid, to a basic solution (e.g. sodium hydroxide) of a silicate, for example, sodium silicate, usually in the presence of an electrolyte, for example, sodium sulfate. Primary, colloidal silica particles typically form during such process which quickly coalesce to form aggregates of such primary particles and which are then recovered as precipitates by filtering, washing the resulting filter cake with water or an aqueous solution, and drying the recovered precipitated silica. Such method of preparing precipitated silica, and variations thereof, are well known to those having skill in such art.

The silica treated carbon black relates to carbon black which contains domains of exposed silica on the surface of the carbon black. Such carbon black may be prepared, for example, by reaction of an alkyl silane (e.g. an alkoxy silane) with carbon black or by co-fuming carbon black and silica at an elevated temperature. For example, see U.S. Pat. Nos. 5,679,728 and 6,028,137.

It is preferred that an in situ reaction of said organo phosphite and silica, optionally including the alkylsilane of formula (III), within the elastomer host may be accomplished without an evolution of an alcohol as compared to using the aforesaid alkoxysilyl polysulfide coupling agent by the inherent chemistry of the organo phosphite material and hydroxyl groups contained on the surface of said silica material in which water evolved instead of an alcohol as a byproduct of the reaction.

In the further practice of the invention, the aforesaid in situ reaction of said organo phosphite silica material within the elastomer host via said internal rubber mixing process is accomplished wherein said silica material is a precipitated silica and/or silica-containing carbon black which is hydrophobated prior to its addition to the elastomer (pre-hydrophobated). Such in situ reaction is considered herein to be important as to both the process of mixing and reacting of the organo phosphite and pre-hydrophobated silica material as to a resulting product thereof. In particular, is it considered herein that pre-hydrophobation of the silica material, particularly with an alkyl silane of the general formula (III) enables a more efficient mixing, or processing, of it within the elastomer host in that such pre-hydrophobation of the silica material (A) renders it more compatible with the diene-based elastomer and (B) substantially reduces a tendency for a precipitated silica to agglomerate with itself within the elastomer host.

In the practice of this invention, said pre-hydrophobated precipitated silica aggregates may be pre-hydrophobated, for example, by treating silica in an aqueous colloidal form thereof with said alkylsilane of Formula (III).

The hydrophobated precipitated silica aggregates might be recovered, for example, from said treated colloidal silica, for example as a treated silica hydrosol, with the aid of acid addition to the treated colloidal silica (for example, sulfuric acid or hydrochloric acid) followed by water washing and drying the recovered hydrophobated silica as a hydrophobated silica gel or as a hydrophobated precipitated silica. While this invention is not intended to be directed to a specific preparation technique (preparation of silica hydrosols, recovery of silica gels and precipitated silicas, etc.) of the pre-hydrophobated precipitated silica itself, for education purposes in this regard, reference might be made to U.S. Pat. Nos. 5,094,829 as well as 5,708,069, 5,789,514 and 5,750,610 for a more detailed discussion.

Representative alkylsilanes of Formula (III) are, for example, trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

Representative organomercaptosilanes of formula (IV) are, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In practice, various diene-based elastomers may be used such as, for example, homopolymers and copolymers of monomers selected from isoprene and 1,3-butadiene and copolymers of at least one diene selected from isoprene and 1,3-butadiene and a vinyl aromatic compound selected from styrene and alphamethyl styrene, preferably styrene.

Representative of such conjugated diene-based elastomers are, for example, cis 1,4-polyisoprene (natural and synthetic), cis 1,4-polybutadiene, styrene/butadiene copolymers (aqueous emulsion polymerization prepared and organic solvent solution polymerization prepared), medium vinyl polybutadiene having a vinyl 1,2-content in a range of about 15 to about 90 percent, isoprene/butadiene copolymers, styrene/isoprene/butadiene terpolymers. Tin coupled elastomers may also be used, such as, for example, tin coupled organic solution polymerization prepared styrene/butadiene co-polymers, isoprene/butadiene copolymers, styrene/isoprene copolymers, polybutadiene and styrene/isoprene/butadiene terpolymers.

The brominated poly(isobutylene-co-para-methylstyrene) polymer may be obtained, for example, as Exxpro 3745, a trademark of the ExxonMobil Chemical Company.

While commonly employed synthetic amorphous silica, or siliceous pigments, used in rubber compounding applications can be used as the silica in this invention, including precipitated siliceous pigments and fumed (pyrogenic) silica, as earlier presented herein said silica is preferably in a form of aggregates of a synthetic, amorphous precipitated silica.

The precipitated silica aggregates preferably employed in this invention are precipitated silicas such as, for example, those obtained by the acidification of a soluble silicate, e.g., sodium silicate and may include co-precipitated silica and a minor amount of aluminum.

Such silicas might usually be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 50 to about 400 cm3/100 g, and more usually about 100 to about 300 cm3/100 g.

Various commercially available precipitated silicas may be considered for use in this invention such as, only for example herein, and without limitation, silicas from PPG Industries under the Hi-Sil trademark with designations Hi-Sil 210, Hi-Sil 243, etc; silicas from Rhodia as, for example, Zeosil 1165MP and Zeosil 165GR, silicas from J. M. Huber Corporation as, for example, Zeopol 8745 and Zeopol 8715, silicas from Degussa AG with, for example, designations VN2 and VN3, as well as other grades of silica, particularly precipitated silicas, which can be used for elastomer reinforcement.

In practice, a purpose of a coupling agent is to aid in enabling said amorphous silica to reinforce the rubber composition, although in a case where said pre-hydrophobated silica inherently contains a coupling agent, use of an additional coupling agent is not believed to be necessary. For example, such coupling agent may be a coupling agent having a moiety reactive with hydroxyl groups contained on the surface of the amorphous silica (e.g. silanol groups) and another moiety interactive with at least one of said diene-based elastomers. Alternatively, said coupling agent may be contained on the silica itself wherein the silica has been pretreated with a coupling agent prior to its addition to the rubber composition.

Representative examples of silica couplers in addition to said organo phosphites are, for example, bis (3-trialkoxysilylalkyl) polysulfides which contain from 2 to 8 carbon atoms with an average of from 2 to 2.6 or from 3.5 to 4 sulfur atoms in its polysulfidic bridge. Representative of such materials are bis (3-triethoxysilylpropyl) polysulfides which contain an average of from 2 to 2.6 or from 3.5 to 4 sulfur atoms in its polysulfidic bridge.

Representative examples of other silica couplers may be organomercaptosilanes such as, for example, triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

In another aspect of the invention, said elastomer composition for said non-black colored tread rubber layer(s) and for rubber composition(s) in direct contact with said non-black colored tread rubber layer(s) of is preferably devoid of rubber processing oil other than paraffinic rubber processing oils which contains less than 14 weight percent aromatic compounds and is preferably devoid of antidegradants other than phenolic antidegradants.

In the practice of this invention, said non-black colored rubber composition may be prepared, for example, by mixing in at least one sequential preparatory (non-productive) blending step in at least one internal rubber mixer to a temperature in a range of about 150° C. to about 180° C. a blend of said diene-based elastomer(s) with said synthetic amorphous silica and/or pre-hydrophobated silica, normally in the absence of sulfur curative, followed by blending the mixture thereof with sulfur curative(s) in a subsequent (productive) blending step in an internal rubber mixer to a temperature in a range of about 110° C. to about 120° C.

In practice, in the case of using the synthetic amorphous silica, a coupling agent may be added in one or more non-productive (preparatory) mixing steps or divided into an addition in a non-productive (preparatory) mixing step and in a productive mixing step together with the sulfur curative.

The reaction of such agents with the hydroxyl groups on the surface of the silica yields an alcohol such as, for example, ethanol during the manufacture of various silica reinforced rubber products. If such evolution of materials other than alcohol in the manufacture of rubber products would be desired, coupling agents which release water instead of alcohol might be used.

For a further understanding of the invention, drawings are presented to depict a cross-sectional perspective of a tire with a tread of non-black color and a tire with a tread with sections on non-black colored rubber.

BRIEF DESCRIPTION OF THE DRAWINGS

In particular.

Figure 1:
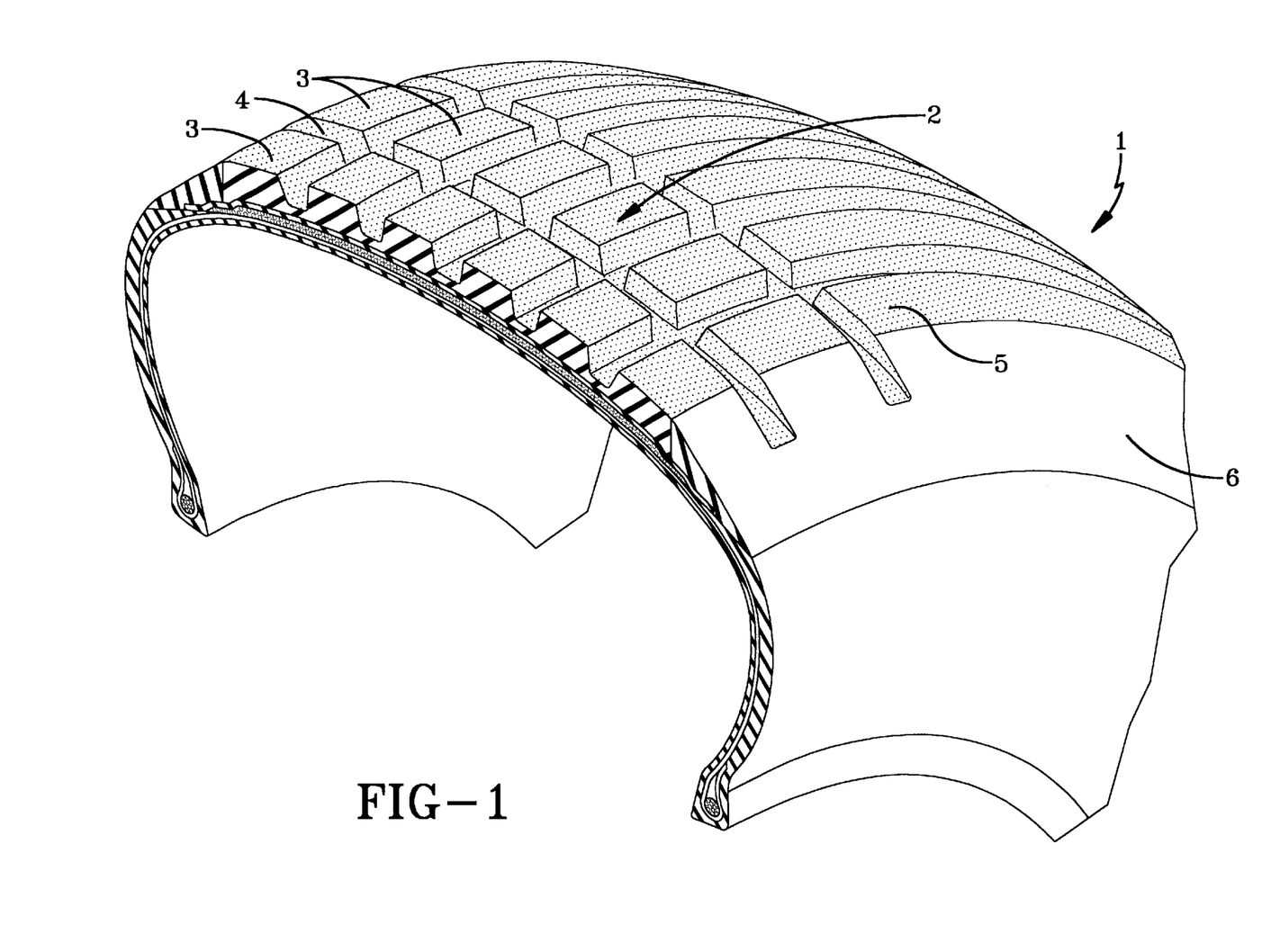
FIG. 1 and FIG. 2 are perspective views of a cross-section of a tire 1 having a co-extruded cap/base construction in which the tread cap 2 is configured with lugs 3 and grooves 4 in which the lugs 3 are designed to be ground-contacting.

In FIG. 1, the tread cap 2 is of a non-black colored rubber which does not contain, and is therefore exclusive of, carbon black and, instead uses silica as a reinforcing agent for a rubber composition which contains a brominated poly (isobutylene-co-para-methylstyrene) polymer with an organophosphite according to this invention, together with a non-black colored colorant.

Figure 2:
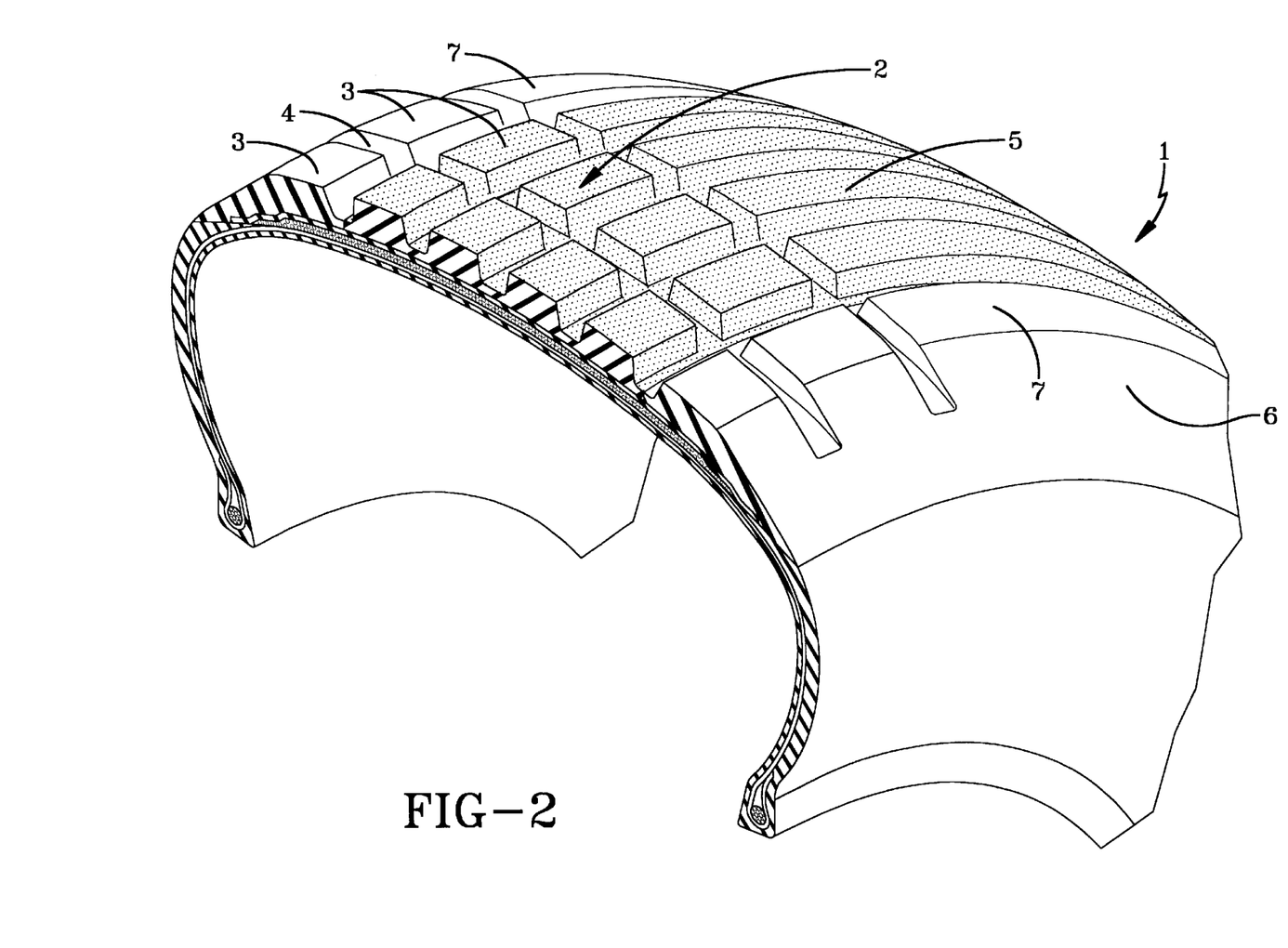

In FIG. 2, the tread cap 2 is divided into three segments wherein two segments 7 are positioned as spaced apart outboard sections of the tread and a center tread cap section 5 is positioned as center section of the tread cap 2 and joins and separates said outboard tread cap sections 7. In particular, the center tread cap section 5 is of a non-black colored rubber composition which does not contain carbon black (is exclusive of carbon black) is reinforced with silica and containing a non-black colored colorant. The outboard tread cap sections 7 are of a black colored, carbon black-containing, rubber composition.

In practice, the invention the rubber composition for said non-black tread rubber layer composition may be is prepared in a sequential series of at least two separate and individual preparatory internal rubber mixing steps, or stages, in which the diene-based elastomer is first mixed with the prescribed silica in the absence of carbon black, in a subsequent, separate mixing step and followed by a final mixing step where curatives are blended at a lower temperature and for a substantially shorter period of time.

It is conventionally required after each mixing step that the rubber mixture is actually removed from the rubber mixer and cooled to a temperature in a range of about 50° C. to about 20° C. and then added back to an internal rubber mixer for the next sequential mixing step, or stage.

The forming of a tire component is contemplated to be by conventional means such as, for example, by extrusion of rubber composition to provide a shaped, unvulcanized rubber component such as, for example, a tire tread. Such forming of a tire tread is well known to those having skill in such art.

It is understood that the tire, as a manufactured article, is prepared by shaping and sulfur curing the assembly of its components at an elevated temperature (e.g. 140° C. to 180° C.) and elevated pressure in a suitable mold. Such practice is well known to those having skill in such art.

The diene-based elastomers for the tire tread rubber composition of this invention, are, for example, homopolymers and copolymers of at least one conjugated diene such as, for example, isoprene and/or 1,3-butadiene and copolymers of at least one conjugated diene, such as for example, isoprene and/or 1,3-butadiene, and a vinyl aromatic compound such as styrene or alphamethyl styrene, preferably styrene.

Representative of such diene-based elastomers are, for example, elastomers comprised of cis 1,4-polyisoprene (natural and synthetic), cis 1,4-polybutadiene, high vinyl polybutadiene having a vinyl 1,2-content in a range of about 35 to about 90 percent, isoprene/butadiene copolymer elastomers, styrene/butadiene copolymer elastomers (organic solvent solution polymerization formed or prepared and aqueous emulsion polymerization formed or prepared), styrene/isoprene copolymer elastomers, and styrene/isoprene/butadiene terpolymer elastomers.

Precipitated silicas are, for example, those obtained by the acidification of a soluble silicate, e.g., sodium silicate, including blends of a sodium silicate and aluminate. Such precipitated silicas are well known to those having skill in such art.

Such amorphous, particularly aggregates of precipitated, silicas might be characterized, for example, by having a BET surface area, as measured using nitrogen gas, preferably in the range of about 40 to about 600, and more usually in a range of about 50 to about 300 square meters per gram. The BET method of measuring surface area is described in the *Journal of the American Chemical Society*, Volume 60, Page 304 (1930).

The silica may also be typically characterized by having a dibutylphthalate (DBP) absorption value in a range of about 100 to about 400, and more usually about 150 to about 300.

The silica is conventionally used in conjunction with a coupling agent as hereinbefore discussed to aid in coupling the silica to at least one of said diene based elastomers and, thus, enhance the elastomer reinforcing effect of the silica. The coupling agent may be mixed in the same mixing stage with the silica or in a subsequent preparatory mixing stage except that it is preferred that the silica is added to the rubber composition prior to the coupling agent. In practice, then the coupling agent then combines in-situ with the silica within the elastomer host.

It is readily understood by those having skill in the art that the rubber composition would be compounded by methods generally known in the rubber compounding art, such as mixing the various sulfur-vulcanizable constituent rubbers with various commonly used additive materials, as herein before discussed, such as, for example, curing aids such as sulfur, activators, retarders and accelerators, processing additives, such as rubber processing oils, resins including tackifying resins, silicas, and plasticizers, fillers, pigments, fatty acid, zinc oxide, waxes, antioxidants and antiozonants, peptizing agents and reinforcing materials such as, for example, carbon black. As known to those skilled in the art, depending on the intended use of the sulfur vulcanizable and sulfur vulcanized material (rubbers), the additives mentioned above are selected and commonly used in conventional amounts.

Representative of phenolic antidegradants for use in this invention are, for example, antioxidants such as polymeric hindered phenol, Wingstay® HLS available from The Goodyear Tire & Rubber Company, including phenolic antidegradants disclosed in *The Vanderbilt Rubber Handbook* (1978), Pages 344 through 346. Other non-staining antidegradants such as poly(oxyalkylene) amine known as OZONOX RP-2 available from Sovereign Chemical Company and cyclic acetal known as Vulkazone AFS available from Bayer A.G., can be considered part of this invention.

Representative non-aromatic rubber processing oils for use in this invention, namely such oils which contain less than 15 weight percent aromatic compounds, if at all, are, and for example, contain 46 percent to 51 percent paraffinic content and 36 percent to 42 percent naphthenic content.

Typical amounts of fatty acids, if used which can include stearic acid, comprise about 0.5 to about 3 phr. Typical amounts of zinc oxide comprise about 1 to about 5 phr. Typical amounts of waxes comprise about 1 to about 5 phr. Often microcrystalline waxes are used. Typical amounts of peptizers comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include elemental sulfur (free sulfur) or sulfur donating vulcanizing agents, for example, an amine disulfide, polymeric polysulfide or sulfur olefin adducts. Preferably, the sulfur vulcanizing agent is elemental sulfur. As known to those skilled in the art, sulfur vulcanizing agents are used in an amount ranging from about 0.5 to about 4 phr, or even, in some circumstances, up to about 8 phr, with a range of from about 1.5 to about 2.5, sometimes from about 2 to about 2.5, being preferred.

Accelerators are used to control the time and/or temperature required for vulcanization and to improve the properties of the vulcanizate. In one embodiment, a single accelerator system may be used, i.e., primary accelerator. Conventionally and preferably, a primary accelerator(s) is used in total amounts ranging from about 0.5 to about 4, preferably about 0.8 to about 2.5, phr. In another embodiment, combinations of a primary and a secondary accelerator might be used with the secondary accelerator being used in smaller amounts (of about 0.05 to about 3 phr) in order to activate and to improve the properties of the vulcanizate. Combinations of these accelerators might be expected to produce a synergistic effect on the final properties and are somewhat better than those produced by use of either accelerator alone. In addition, delayed action accelerators may be used which are not affected by normal processing temperatures but produce a satisfactory cure at ordinary vulcanization temperatures. Vulcanization retarders might also be used. Suitable types of accelerators that may be used in the present invention are amines, disulfides, guanidines, thioureas, thiazoles, thiurams, sulfenamides, dithiocarbamates and xanthates. Preferably, the primary accelerator is a sulfenamide. If a second accelerator is used, the secondary accelerator is preferably a guanidine, dithiocarbamate or thiuram compound.

The mixing of the rubber composition can preferably be accomplished by the aforesaid sequential mixing process. For example, the ingredients may be mixed in at least three stages, namely, at least two non-productive (preparatory) stages followed by a productive (final) mix stage. The final curatives are typically mixed in the final stage which is conventionally called the "productive" or "final" mix stage in which the mixing typically occurs at a temperature, or ultimate temperature, lower than the mix temperature(s) of the preceding non-productive mix stage(s). The terms "non-productive" and "productive" mix stages are well known to those having skill in the rubber mixing art.

The invention may be better understood by reference to the following examples in which the parts and percentages are by weight unless otherwise indicated.

EXAMPLE I

In this Example, a rubber composition which contained carbon black reinforcement, thereby of a black color, and a rubber composition which contained silica reinforcement, exclusive of carbon black and containing a purple colorant and thereby of a purple color were prepared by mixing the ingredients in an internal rubber mixer in a sequential series of non-productive (without sulfur and accelerators) mixing steps and a final productive (with sulfur and accelerator addition at a lower mix temperature) mixing step.

For the carbon black-containing rubber composition, a total of two non productive mixing steps were used and for the silica reinforced rubber composition, a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Sample B utilizes the silica reinforcement together with a paraffinic rubber processing oil, non-staining phenolic antioxidant and a silica coupling agent.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A and B.

TABLE 1

| | Control Sample A | Sample B |
|---|---|---|
| First Non-Productive Mixing Step (to 160° C.) | | |
| Styrene/butadiene rubber[1] | 0 | 80 |
| Polybutadiene rubber[2] | 0 | 20 |
| Styrene/butadiene rubber[3] | 96.25 | 0 |
| Budene 1254[4] | 37.5 | 0 |
| Carbon black[5] | 70 | 0 |
| Silica[6] | 0 | 50 |
| Coupling Agent[7] | 0 | 3.9 |
| Aromatic processing oil | 10 | 0 |
| Paraffinic processing oil | 0 | 20 |
| Antioxidant[8] | 0 | 2 |
| Zinc oxide | 2 | 2 |
| Fatty acid[9] | 2 | 3 |
| Second Non-Productive Mixing Step (to 160° C.) | No | Yes |
| Silica[6] | 0 | 20 |
| Coupling agent[7] | 0 | 1.6 |
| Paraffinic processing oil | 0 | 8 |
| Productive Mixing Step (to 115° C.) | | |
| Accelerator(s)[10] | 1.3 | 3.5 |
| Sulfur | 1.5 | 1.4 |

TABLE 1-continued

| | Control Sample A | Sample B |
|---|---|---|
| Antidegradant(s)[11] | 1.2 | 0 |
| Colorant (purple)[12] | 0 | 2 |

[1]Emulsion polymerization prepared styrene/butadiene rubber obtained as Plioflex 1502 from The Goodyear Tire & Rubber Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol ® 8745 from the J. M. Huber Corporation
[7]Obtained as liquid Si69 from Degussa AG, as a bis-(3-triethoxysilylpropyl) tetrasulfide
[8]Non-staining antioxidant Wingstay ® HLS from The Goodyear Tire & Rubber Company
[9]Primarily stearic acid
[10]Sulfenamide and diphenylguanidine or tetramethylthiuram disulfide type
[11]Mixed diaryl-p-phenylenediamine type antioxidant from The Goodyear Tire & Rubber Company
[12]Colorant obtained from Akrochem Corporation An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 1 were cured for about 14 minutes at about 160° C. Various resulting physical properties are shown in the following Table 2.

TABLE 2

| | Sample A | Sample B |
|---|---|---|
| Rheometer, 160° C. | | |
| Maximum torque, (dNm) | 12 | 14 |
| Minimum torque, (dNm) | 2.5 | 1.4 |
| Delta torque, dNm (Max-min torque) | 9.5 | 12.6 |
| T90, minutes | 6.2 | 8.6 |
| Stress Strain (Modulus) | | |
| 100% modulus (MPa) | 1.2 | 1.4 |
| 300% modulus (MPa) | 4.7 | 6.1 |
| Tensile strength (MPa) | 17.4 | 18.6 |
| Elongation at break, (%) | 689 | 628 |
| Rebound | | |
| 100° C. | 47 | 59 |
| Hardness | | |
| Shore A, 100° C. | 48 | 51 |
| DIN Abrasion (10 N force) (cm³ loss) | 73 | 91 |

It is seen from Table 2 that Sample B, a purple colored sample, has superior 300 percent modulus, hardness and rebound as compared to Control Sample A. This is considered herein to be important such properties of a non-black colored rubber lamina are considered herein to be suitable for a tire tread surface intended to be ground contacting.

EXAMPLE II

A rubber tire is prepared having a tread of a cap/base construction where said tread cap is separated into three sections with lugs designed to be ground-contacting, namely two outboard sections and a central inboard section, all of about equal widths, wherein said outboard sections are of a non-black color, exclusive of carbon black, of the purple colored rubber composition of Sample B of Example I, and the inboard section of a black-colored, carbon black-containing rubber composition of Sample A of Example I.

EXAMPLE III

In this Example, Control Sample A of Example I is reported as it was in Example I which contained carbon black reinforcement without silica reinforcement and, also therefore without a silica coupling agent.

Samples C and D are reported herein as rubber samples which contain a brominated copolymer of isobutylene and para-methyl stryene rubber (also referred to as "BIMS" rubber as well as at least one diene-based elastomer and silica reinforcement.

Sample D also contained an organo phosphite, namely triphenyl phosphite, as a coupling agent for said BIMS.

For the Sample A carbon black-containing rubber composition, a total of two non productive mixing steps were used (Example I) and for the silica reinforced rubber compositions (Samples C and D) a total of three non-productive mixing steps were used. The rubber compositions were dumped from the rubber mixer after each mixing step, sheeted out from an open mill and allowed to cool to below 40° C. after each mixing step.

The representative rubber compositions shown in the following Table 1 where Sample A (with carbon black reinforcement) is used as a comparative Control Sample and Samples C and D utilized the silica reinforcement together with a paraffinic rubber processing oil, non-staining phenolic antioxidant.

The non-productive mixing steps were for about 5 minutes to a temperature of about 160° C. The productive mixing step was for about 2 minutes to a temperature of about 115° C.

Table 1 illustrates the ingredients used for preparing the rubber compositions of Samples A (from Example I), C and D.

TABLE 3

|  | Control Sample A | Sample C | Sample D |
|---|---|---|---|
| First Non-Productive Mixing Step (to 160° C.) | | | |
| BIMS rubber[1] | 0 | 40 | 40 |
| Polybutadiene rubber[2] | 0 | 30 | 30 |
| Polyisoprene rubber | 0 | 30 | 30 |
| Styrene/butadiene rubber[3] | 96.25 | 0 | 0 |
| Budene 1254[4] | 37.5 | 0 | 0 |
| Carbon black[5] | 70 | 0 | 0 |
| Silica[6] | 0 | 66 | 66 |
| Aromatic processing oil | 10 | 0 | 0 |
| Paraffinic processing oil | 0 | 25 | 25 |
| Zinc oxide | 2 | 0 | 0 |
| Fatty acid[7] | 2 | 0 | 0 |
| Phosphite[8] | 0 | 0 | 10 |
| Second Non-Productive Mixing Step (160° C.) | No | Yes | Yes |
| Zinc Oxide | 0 | 2.5 | 2.5 |
| Antidegradants[9] | 0 | 3.0 | 3.0 |
| Carbon black[10] | 0 | 10 | 10 |

TABLE 3-continued

|  | Control Sample A | Sample C | Sample D |
|---|---|---|---|
| Productive Mixing Step (to 115° C.) | | | |
| Accelerator(s)[11] | 1.3 | 3.5 | 3.5 |
| Sulfur | 1.5 | 2.2 | 2.2 |
| Antidegradant(s)[12] | 1.2 | 0 | 0 |

[1]Brominated copolymer of isobutylene and para-methyl stryene rubber obtained as Exxpro 3745 from The ExxonMobil Chemical Company
[2]Cis 1,4-polybutadiene rubber obtained as Budene 1207 from The Goodyear Tire & Rubber Company
[3]Oil extended emulsion polymerization prepared styrene/butadiene rubber obtained as Plioflex 1712 from The Goodyear Tire & Rubber Company
[4]Oil extended cis 1,4-polybutadiene rubber obtained as Budene 1254 from The Goodyear Tire & Rubber Company
[5]N234 carbon black, an ASTM designation
[6]Obtained as Zeopol® 8715 from the J. M. Huber Corporation
[7]Primarily stearic acid
[8]Triphenyl phosphite
[9]P-phenylenediamine type
[10]N472 carbon black, an ASTM designation, obtained as Vulcan XC-72 from Cabot Corporation
[11]Sulfenamide and diphenylguanidine or tetramethylthiuram disulfide type
[12]Mixed diaryl-p-phenylenediamine type antioxidant from The Goodyear Tire & Rubber Company An aromatic rubber processing oil was used which can be characterized as 40 percent to 41 percent aromatic, 21 percent to 26 percent naphthenic and 34 percent to 38 percent paraffinic. A paraffinic rubber processing oil was used which can be characterized as 46 percent to 51 percent paraffinic, 36 percent to 42 percent naphthenic and 11 percent to 14 percent aromatic.

The rubber compositions of Table 3 were cured for about 14 minutes at about 160° C. Various resulting physical properties are shown in the following Table 4, with the physical properties for Sample A simply taken from Table 2 of Example I.

TABLE 4

|  | Sample A | Sample C | Sample D |
|---|---|---|---|
| Stress Strain (Modulus) | | | |
| 100% modulus (MPa) | 1.2 | 1.6 | 1.2 |
| 300% modulus (MPa) | 4.7 | 8.5 | 4.8 |
| Tensile strength (MPa) | 17.4 | 11.5 | 10.9 |
| Elongation at break, (%) | 689 | 417 | 617 |
| Rebound | | | |
| 100° C. | 47 | 67 | 49 |
| Hardness | | | |
| Shore A, 100° C. | 48 | 51 | 51 |
| DIN Abrasion (10 N force) (cm³ loss) | 73 | 172 | 132 |
| Peel Adhesion (95° C.), N | 170 | 38 | 159 |

From Table 4 it is seen that moduli, rebound and hardness values for Sample C, which included the BIMS polymer and silica, are improved over the Sample A values which is indicative of improved tire handling an rolling resistance for tires having treads of such composition.

From Table 4 it is also seen that tear strength as measured in a peel adhesion test and abrasion resistance or Sample D are improved as compared to Sample C which is indicative of improved durability of the rubber composition. Moreover, the properties of Sample D are very similar to Sample A (e.g. modulus, elongation at break, rebound and peel adhesion) indicating good compatibility for Sample A and D rubber compositions when positioned next to each other in an article of manufacture such as, for example a tire.

While various embodiments are disclosed herein for practicing the invention, it will be apparent to those skilled in this art that various changes and modifications may be made therein without departing from the spirit or scope of the invention.

What is claimed is:

1. A tire having a tread comprised of at least one non-black colored, exclusive of carbon black, rubber composition, wherein said tread is of a co-extruded cap/base construction; wherein said tread cap is configured with lugs and grooves; wherein said tread cap is comprised of said non-black colored rubber composition comprised of, based upon parts by weight per 100 parts by weight elastomer(s), (phr):
   (A) 100 phr of elastomer comprised of
      (1) about 5 to about 80 phr of a halogenated copolymer of isobutylene and p-methyl styrene, wherein said halogen is bromine,
      (2) about 20 to about 95 phr of at least one diene-based elastomer and
   (B) about 25 to about 100 phr of particulate reinforcing filler comprised of synthetic amorphous silica aggregates, wherein said silica aggregates contain hydroxyl groups (e.g. silanol groups) on their surface; and
   (C) about 0.5 to about 25 phr of at least one organo phosphite selected from monophosphites selected from formula (I) and diphosphites selected from formula (II) and diisodecyl pentearythritol diphosphite, distearyl pentaerythritol diphosphite and pentearythritol diphosphite:

(I)

(II)

wherein each $R^4$ radical is independently selected from alkyl radicals and phenyl radicals and alkyl substituted phenyl radicals; wherein said $R^4$ alkyl radicals have from 1 to 18 carbon atoms, wherein $R^5$ is a phenyl radical; and wherein $R^6$ is selected from alkyl radicals having from 2 to 8 carbon atoms;
wherein said organo phosphite is provided by one or more of the following:
   (a) by mixing said organo phosphite with said elastomer(s) and said synthetic silica,
   (b) by pre-reacting said halogenated copolymer of isobutylene and p-methyl styrene with said organo phosphite prior to blending said reinforcing filler therewith,
   (c) by pre-reacting said organo phosphite with an aqueous dispersion of colloidal silica particles from which a precipitated silica is recovered to form an organo phosphite/silica composite thereof,
   (d) mixing said organo phosphite with said elastomer(s) and said synthetic silica according to any of said steps (a), (b) or (c), wherein said synthetic silica includes at pre-hydrophobated silica aggregates which have been pre-hydrophobated prior to mixing with said elastomers with an alkylsilane of formula (III),
   (e) mixing said organo phosphite with said elastomer(s) and an alkylsilane of the said Formula (III) with said elastomer(s) and said synthetic silica, preferably in an internal rubber mixer, and
   (f) by pre-reacting said organo phosphite and said alkylsilane of Formula (III), and optionally with an organomercaptosilane of Formula (IV), with
      (i) said aggregates of synthetic precipitated silica or
      (ii) an aqueous dispersion of colloidal silica particles from which a precipitated silica is recovered to form a silica composite thereof,
wherein said alkylsilane of the general Formula (III) is represented by wherein R is an alkyl radical having from one to 18 carbon atoms, n is a value of from 1 to 3 and X is a radical selected from chlorine or bromine or alkoxy radical as $(OR^1)$—, wherein $R^1$ is an alkyl radical selected from methyl and ethyl radicals, and where said organomercaptosilane is of the general formula (IV):

wherein X is a radical selected from chlorine, bromine, and alkyl radicals having from one to 16 carbon atoms: wherein $R^2$ is an alkyl radical having from one to 16 carbon atoms and $R^3$ is an alkylene radical having from one to 16 carbon atoms; and n is a value from zero to 3.

2. The tire of claim 1 wherein said tread cap is composed of three co-extruded transverse sections, each section positioned circumferentially around the tire and extending from one peripheral edge of the tread to the other, namely, two, spaced apart outboard tire tread cap sections each section including about 10 to about 40 percent of the tire tread cap and a third tire tread cap section positioned in the central portion of the tire tread cap and between said outboard tire tread cap sections; where said central tire tread cap is of a non black-colored, exclusive of carbon black, rubber composition and said outboard tire tread rubber compositions are of a black colored, carbon black containing, rubber composition.

3. The tire of claim 1 wherein said non-black colored, rubber composition is comprised of 100 phr of elastomer comprised of
   (A) about 50 to about 90 phr of at least one diene-based elastomer and
   (B) about 10 to about 50 phr of a halogenated copolymer of isobutylene and p-methyl styrene, wherein said halogen is bromine.

4. The tire of claim 1 wherein said silica is comprised of aggregates of precipitated silica having hydroxyl groups on the surface thereof.

5. The tire of claim 1 wherein said silica is comprised of pre-hydrophobated aggregates of precipitated silica having been pre-hydrophobated by treating silica in an aqueous colloidal form thereof with both an organomercaptosilane and an alkylsilane in a weight ratio of said organomercaptosilane to said alkylsilane in a range of from 10/90 to 90/10;
wherein said alkylsilane is of the general Formula (III)

wherein R is an alkyl radical selected from methyl, ethyl, isopropyl, n-butyl and octadecyl radicals, n is a value of from 1 to 3 and X is selected from a chlorine radical or an alkoxy radical as (OR¹)—, wherein R1 is selected from methyl and ethyl and where said organomercaptosilane is of the general formula (IV):

$$(X)_n(R^2O)_{3-n}\text{—Si—}R^3\text{—SH} \qquad (IV)$$

wherein X is selected from a chlorine radical or an alkyl radical selected from at least one of methyl, ethyl, n-propyl and n-butyl radicals; wherein R² is an alkyl radical selected from methyl and ethyl radicals and R³ is an alkylene radical having from one to 4 carbon atoms, and n is a value from zero to 3.

6. The tire of claim 1 wherein said coupling agent for said aggregates of precipitated silica is a bis(3-trialkoxysilylalkyl) polysulfide wherein alkyl radicals for said alkoxy groups are selected from one or more of methyl and ethyl radicals and the alkyl radical for said silylalkyl component is selected from butyl and propyl radicals, and wherein said polysulfide component contains from 2 to 8, with an average of from 2 to 2.6 or from 3.5 to 4, sulfur atoms in its polysulfidic bridge.

7. The tire of claim 6 wherein said coupling agent is bis(3-triethoxysilylpropyl) polysulfide having an average of from 2 to 2.6 or from 3.5 to 4, sulfur atoms in its polysulfidic bridge.

8. The tire of claim 6 wherein said coupling agent is added directly to the elastomer mixture.

9. The tire of claim 6 wherein said coupling agent is added to the elastomer as a composite of precipitated silica and such coupling agent formed by treating a precipitated silica therewith or by treating a colloidal silica therewith and precipitating the resulting composite.

10. The tire of claim 1 wherein said coupling agent is exclusive of silane based coupling agents and contains a moiety which does not provide an alcohol byproduct upon reaction with said hydroxyl groups contained on the surface of said silica.

11. The tire of claim 1 wherein said organo phosphite is selected from at least one of triisodecyl phosphite, trilauryl phosphite, tris(tridecyl) phosphite, diphenyl isooctyl phosphite, diphenyl isodecyl phosphite, phenyl diisodecyl phosphite, triphenyl phosphite, triisononylphenyl phosphite, trimethyl phosphite, triethyl phosphite, tris (2-chloroethyl) phosphite, triisopropyl phosphite, tributyl phosphite, tri-isooctyl phosphite and tris (2-ethylhexyl) phosphite, tris (2,4-di-t-butylphenyl) phosphite, and bis 2,4,6,tri-t-butylphenyl 2-butyl-2-ethyl-1,3-propanediol phosphite; distearyl pentaerythritol diphosphite, bis (2,4-di-t-butylphenyl) pentaerythritol diphosphite, bis (2,6,di-t-butyl-4-methylphenyl pentaerythritol diphosphite, bis (2,4-dicumylphenyl) pentaerythritol diphosphite and mixtures thereof.

12. The tire of claim 1 wherein said organo phosphite is tris (2-ethylhexyl) phosphite.

13. The tire of claim 1 wherein said alkylsilanes of Formula (III) are selected from at least one trichloro methyl silane, dichloro dimethyl silane, chloro trimethyl silane, trimethoxy methyl silane, dimethoxy dimethyl silane, methoxy trimethyl silane, trimethoxy propyl silane, trimethoxy octyl silane, trimethoxy hexadecyl silane, dimethoxy dipropyl silane, triethoxy methyl silane, triethoxy propyl silane, triethoxy octyl silane, and diethoxy dimethyl silane.

14. The tire of claim 1 wherein said organomercaptosilanes of Formula (IV) are selected from at least one of triethoxy mercaptopropyl silane, trimethoxy mercaptopropyl silane, methyl dimethoxy mercaptopropyl silane, methyl diethoxy mercaptopropyl silane, dimethyl methoxy mercaptopropyl silane, triethoxy mercaptoethyl silane, and tripropoxy mercaptopropyl silane.

15. The tire of claim 1 wherein said elastomer composition for said non-black colored rubber composition and for rubber composition(s) in direct contact with said non-black colored tread rubber layer(s) are devoid of rubber processing oil other than paraffinic rubber processing oils which contains less than 16 weight percent aromatic compounds and is devoid of amine based antidegradants.

\* \* \* \* \*